United States Patent [19]
Lohwasser et al.

[11] Patent Number: 6,027,793
[45] Date of Patent: *Feb. 22, 2000

[54] PACKAGING FILM

[75] Inventors: Wolfgang Lohwasser, Gailingen, Germany; Olaf Frei, Siblingen, Switzerland; Olivier Y. Muggli, Louisville, Ky.

[73] Assignee: Alusuisse Technology & Management Ltd., Nevhausen am Rheinfall, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/963,266

[22] Filed: Nov. 3, 1997

[51] Int. Cl.$^7$ .............. B32B 7/02; B32B 27/30; B32B 27/32; B32B 27/40

[52] U.S. Cl. ............ 428/216; 428/215; 428/336; 428/425.5; 428/448; 428/451; 428/910

[58] Field of Search .............. 428/336, 425.5, 428/451, 448, 213, 215, 216, 910

[56] References Cited

U.S. PATENT DOCUMENTS

| | | | |
|---|---|---|---|
| 3,442,686 | 5/1969 | Jones | 428/336 |
| 5,100,720 | 3/1992 | Sawada et al. | 428/215 |
| 5,508,075 | 4/1996 | Roulin et al. | 428/35.7 |
| 5,641,559 | 6/1997 | Namiki | 428/215 |
| 5,763,088 | 6/1998 | Nakano et al. | 428/424.8 |

FOREIGN PATENT DOCUMENTS

| | | |
|---|---|---|
| 0549528 | 12/1992 | European Pat. Off. . |
| 0622399 | 4/1994 | European Pat. Off. . |
| 2712310 | 11/1993 | France . |

OTHER PUBLICATIONS

Von Klaus Maschig, "Verpackungstechnik: neue Materilaien Weich und glasig," vol. 82, No. 36 (Sep. 30, 1990), pp. 64 to 67, (Maschig).

Chemical Abstracts, vol. 86, No. 26, (Jun. 27, 1977), abstract No. 1910139.

*Primary Examiner*—D. S. Nakarani
*Attorney, Agent, or Firm*—Fisher, Christen & Sabol

[57] ABSTRACT

A packaging film which is transparent to UV light and has a barrier action against water vapor and gases features at least one substrate layer of a polyolefin or polyamide with a ceramic coating of $SiO_x$, where x is a number from 1.5 to 2 and the thickness of the ceramic layer is 10 nm to 2 $\mu$m. The packaging film is suitable for packaging basic and luxury foodstuffs that are sterilized in the packaged condition by radiation with UV light.

4 Claims, No Drawings

PACKAGING FILM

BACKGROUND OF THE INVENTION

1. Field of the Invention

The invention relates to a packaging film which is transparent to UV light and has a barrier action against water vapour and gases. Within the scope of the invention is also a process and a use of such a packaging film.

2. Background Art

The sterilization of transparent products by radiation with UV light is known. It is used today e.g. for decontaminating drinking water. It is also known that the storage time of natural untreated foodstuffs can be extended if these are radiated with UV light The UV rays have a decontaminating action only on the surface of a foodstuff. An essentially untreated foodstuff is however sterile on the inside, so that the radiation of the surface is sufficient for decontamination purposes.

In order to keep a product sterile, it is appropriate to perform the sterilization of the foodstuff while it is in the packaging; this way it is not possible for the contents subsequently to come into contact with non-sterile surfaces.

The packaging materials that are known today and are used for packaging foodstuffs either have no adequate barrier action against water vapour or oxygen, or are not transparent to UV radiation. Especially when employing very high energy (short wave) UV light, as is supplied e.g. by excimer lamps, the choice of possible packaging materials is very limited. For example, among others, polyethylene-terephthalate (PET) cannot be used because of its absorption edge at 330 to 350 nm, nor polyvinylidenchloride (PVDC). The choice of possible packaging materials that are transparent to UV light is limited therefore to polyamides (PA) and polymers and copolymers of ethylvinyl-alcohol (EVOH). Often, however, it is not possible to achieve adequate barrier values against water vapor. The barrier against gases and aromas is also often not sufficient.

It has already been found that the barrier properties of plastics can be improved in some cases by thin film vacuum deposition of $SiO_x$ or aluminium oxide coatings using methods such as PVD (physical vapor deposition) or by CVD (chemical vapor deposition). However, the processes and coatings used up to now have yielded substantial improvements with respect to the barrier action against water vapor and gases only with PET or the layers known to date are discoloured i.e. yellowish or greyish and consequently have high absorption in the UV range.

DESCRIPTION OF THE INVENTION

The object of the present invention is therefore to provide a packaging film of the kind described at the s tart which is both transparent to UV light and exhibits excellent barrier properties with respect to water vapor and gases.

That objective is achieved by way of the invention in that the packaging material features a substrate film of a polyolefin or polyamide with a ceramic coating of $SiO_x$, where x is a number from 1.5 to 2 and the thickness of the ceramic layer is 10 nm (nanometer) to 2 $\mu$m.

The coating of a known UV-transparent substrate film with a ceramic layer of $SiO_x$ having a composition and thickness according to the invention results in a packaging material which, apart from good transparency for UV radiation, exhibits excellent barrier properties with respect to water vapor and gases.

The substrate film is preferably an oriented polypropylene (oPP) film, advantageously an oPP film with a 0.5 to 2 $\mu$m thick outer layer of a copolymer of polyethylene (PE)/polypropylene (PP) comprising 1 to 20% PE, in particular 2 to 5% PE. This variant provides excellent barrier properties with respect to water vapor combined with very good barrier properties with respect to oxygen.

Plasma pre-treatment of the substrate film before coating with $SiO_x$ provides a further improvement in the barrier properties with respect to water vapor and oxygen.

A further version of a substrate film is an oriented polypropylene film (oPP) with a 0.5 to 2 $\mu$m thick outer layer of polymers or copolymers of ethylvinyl alcohol (EVOH).

If a polyamide film is employed as the substrate film, then this is preferably a biaxially stretched oriented polyamide film (oPA).

The substrate film coated with $SiO_x$, can in principle be used directly as packaging material. In order to control the sealing properties, however, the substrate film may be coated on one or both sides with UV transparent sealing layers e.g. of PP or PE. The coating takes place preferably using a laminating adhesive based on polyurethane. Laminating with further UV transparent layers such as oPA may be used as a means of improving the mechanical properties. The mentioned further UV transparent layers which may be laminated with the $SiO_x$ coated substrate layer to form packaging materials with different properties with respect to mechanical strength and sealing capacity, must not contain any aromatic carbohydrates. For that reason, aliphatic systems which exhibit optimal UV transparency are preferred.

The ceramic layers with $SiO_x$ may be deposited on the substrate film e.g. using vacuum thin film techniques, preferably by electron beam vaporization.

According to the invention a 10 nm to 2 $\mu$m thick ceramic layer of $SiO_x$ is deposited onto a polyolefin or polyamide substrate film using a generally known vacuum thin film deposition process by depositing silicon oxide ($SiO_2$) and metallic silicon (Si) simultaneously in vacuum, where the value x is a number from 1.5 to 2, preferably 1.5 to 1.9 and in particular 1.5 to 1.8. The amount of $SiO_2$ to Si is preferably adjusted in such a way that, stoichiometrically, a deficit of 10 to 30% oxygen—with reference to the pure oxide—results in the evaporated material.

The vaporization of $SiO_2$ and Si occurs preferably simultaneously from a common evaporisation source i.e. from a mixture of $SiO_2$ and Si.

As materials to be evaporated, further additives such as $Al_2O_3$, $B_2O_3$ and MgO may be added to the $SiO_2$ in amounts up to 50 mol %, preferably 5 to 30 mol %, in each case with reference to $SiO_2$.

Further additions that may be made to the materials to be evaporated are e.g. Al, B and/or Mg in pure form or as Si alloy, in amounts up to 50 mol %, preferably 5 to 30 mol %, in each case with reference to Si.

The ratio of $SiO_2$, $Al_2O_3$, $B_2O_3$ and MgO to Si, Al, B and Mg is adjusted e.g. such that there is a stoichiometric deficit of 10 to 30% oxygen, with reference to the sum of the pure oxides in the evaporated material.

The coating process is controlled via the rate of vaporization of the material to be vaporised, the rate of deposition on the substrate and the duration of exposure of the substrate to the vacuum chamber atmosphere, in such a manner that a $SiO_2$ coating having a thickness of 10 nm to 2 $\mu$m, preferably 30 nm to 1 $\mu$m, and in particular 40 nm to 100 nm is obtained.

The $SiO_x$ coated substrate film may, as mentioned above, be provided on one or both sides with further UV transparent layers. The deposition of these additional layers may be performed e.g. by laminating or using laminating adhesive.

The packaging material according to the invention is suitable in particular for manufacturing flexible packaging such as pouches and as lid material for sealing onto containers. A particularly suitable field of application is in the use of the packaging material according to the invention for packaging basic and luxury foodstuffs that are sterilized in the packaged condition by radiation with UV light.

The superiority of the packaging material according to the invention over the present day, conventional materials—with respect to UV transparency and barrier action against water vapor and gases—is supported by the following table showing measured values of the above mentioned properties.

|   |   | Oxygen barrier [cm$^3$/(m$^2$ 24 h bar)] at 25° C. 50% rH | Water vapor barrier [g/(m$^2$ 24 h)] at 25° C. 50% rH | UV-transmission [%] at 251 nm |
|---|---|---|---|---|
| 1 | oPA (15 μm)//PE (50 μm) | 40 | 2 | 72 |
| 2 | oPA (15 μm)/SiO$_x$/PE (50 μm) | 0.2 | 0.4 | 65% |
| 3 | oPP (20 μm)//PE (50 μm) | 1800 | 1.0 | 79% |
| 4 | oPP (20 μm)/SiO$_x$//PE (50 μm) | 3.0 | 0.1 | 75% |
| 5 | PET (12 μm)//PE(50 μm) | 119 | 3 | 0% |
| 6 | oPA -PVDC | 2.5 | 0.3 | 5% |

Versions 2 and 4 according to the invention show both excellent UV transparency and good barrier action against water vapour and oxygen. The versions 1, 3, 5 and 6 not within the range covered by the invention exhibit considerably poorer properties at least with respect to those required.

We claim:

1. Packaging film which is transparent to UV light and has a barrier action against water vapor and gases, the packaging material comprising a substrate film of an oriented polypropylene film (oPP) with a 0.5 to 2 μm thick cover layer of a polymer of ethyl vinyl alcohol (EVOH) or a copolymer of ethylene and ethyl vinyl alcohol, with a ceramic coating of SiO$_x$, where x is a number from 1.5 to 1.8, coated on the surface of the cover layer opposite of the oriented polypropylene foam, and the thickness of the ceramic layer is 10 nm to 2 μm.

2. The packaging film according to claim 1, wherein the outer layer on the oriented polypropylene (oPP) film is a polymer of ethyl vinyl alcohol (EVOH).

3. The packaging film according to claim 1, wherein at least one further UV transparent layer has been coated on the surface of the ceramic layer opposite of the coated substrate film.

4. The packaging film according to claim 3, wherein the further UV transparent layer has been coated on the ceramic layer using a polyurethane adhesive.

* * * * *